US012771208B2

(12) United States Patent
Kummer

(10) Patent No.: US 12,771,208 B2
(45) Date of Patent: Oct. 20, 2026

(54) ROTOR OF AN EXTERNALLY EXCITED SYNCHRONOUS MACHINE

(71) Applicant: Dr. Ing. h.c. F. Porsche Aktiengesellschaft, Stuttgart (DE)

(72) Inventor: Stefan Kummer, Bietigheim-Bissingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 193 days.

(21) Appl. No.: 18/757,515

(22) Filed: Jun. 28, 2024

(65) Prior Publication Data

US 2025/0015673 A1 Jan. 9, 2025

(30) Foreign Application Priority Data

Jul. 4, 2023 (DE) ..................... 10 2023 117 609.9

(51) Int. Cl.
*H02K 9/19* (2006.01)
*H02K 1/24* (2006.01)

(52) U.S. Cl.
CPC ................. *H02K 9/19* (2013.01); *H02K 1/24* (2013.01)

(58) Field of Classification Search
CPC .. H02K 9/19; H02K 1/24; H02K 1/32; H02K 3/24; H02K 1/26; H02K 1/2706
USPC .................................................... 310/54, 214
See application file for complete search history.

(56) References Cited

U.S. PATENT DOCUMENTS

| | | | | |
|---|---|---|---|---|
| 2015/0015098 | A1 | 1/2015 | Suzuki | |
| 2017/0353092 | A1* | 12/2017 | Park | H02K 1/24 |
| 2018/0109170 | A1* | 4/2018 | Park | H02P 29/00 |
| 2018/0115222 | A1* | 4/2018 | Lassila | H02K 1/165 |
| 2018/0375395 | A1 | 12/2018 | Yamagishi | |
| 2021/0013757 | A1* | 1/2021 | Petrov | H02K 3/24 |
| 2021/0376687 | A1* | 12/2021 | Phielix | B33Y 80/00 |

(Continued)

FOREIGN PATENT DOCUMENTS

| | | | |
|---|---|---|---|
| DE | 102014009926 | A1 | 1/2015 |
| DE | 102019216982 | A1 | 5/2021 |

(Continued)

OTHER PUBLICATIONS

Meyer Christian (DE 102019212391) (Year: 2021).*

*Primary Examiner* — Ahmed Elnakib
(74) *Attorney, Agent, or Firm* — LEYDIG, VOIT & MAYER, LTD.

(57) ABSTRACT

A rotor, including a rotor core having teeth arranged star-shaped about a rotor axis, a winding per rotor tooth, which is wound around a corresponding tooth, and a displacement body arranged in a groove between the windings of adjacent teeth and extending in an axial direction. The rotor includes a cooling channel arranged in the displacement body, including a coolant inlet on an axial end face of the displacement body, configured to introduce coolant into the cooling channel, and a coolant outlet on an opposite axial front axis of the displacement body, configured to discharge coolant from the cooling channel. A slope is provided between the coolant inlet and outlet in a radial direction of the rotor. A distance in the radial direction from the coolant inlet to the rotor axis is less than a distance in the radial direction from the coolant outlet to the rotor axis.

13 Claims, 4 Drawing Sheets

(56) References Cited

U.S. PATENT DOCUMENTS

| | | | | |
|---|---|---|---|---|
| 2022/0216761 | A1* | 7/2022 | Danckers | H02K 1/20 |
| 2025/0015673 | A1* | 1/2025 | Kummer | H02K 1/32 |

FOREIGN PATENT DOCUMENTS

| | | | | |
|---|---|---|---|---|
| EP | 2110926 | A1 | 10/2009 | |
| EP | 2490322 | A1 | 8/2012 | |
| EP | 4142121 | A1 | 3/2023 | |
| WO | WO-2024170041 | A1 * | 8/2024 | H02K 9/19 |

* cited by examiner

ROTOR OF AN EXTERNALLY EXCITED SYNCHRONOUS MACHINE

CROSS REFERENCE TO RELATED APPLICATIONS

This application claims benefit to German Patent Application No. DE 10 2023 117 609.9, filed on Jul. 4, 2023, which is hereby incorporated by reference herein.

FIELD

The invention relates to a rotor of an externally excited synchronous machine, in particular in a motor vehicle.

BACKGROUND

Electric motors in the form of externally excited synchronous machines (FSM) do not have permanent magnets in the rotor compared to permanently excited synchronous machines (PSM). The magnetic field in the rotor is generated via electromagnets, which are formed by windings about so-called rotor teeth. During operation of externally excited synchronous machines, friction effects and the currents required to maintain the magnetic fields in the windings sometimes result in high temperatures in both the rotor and the stator, which are disadvantageous with regard to both the efficiency and the service life of the electric motors. Consequently, FSM rotors are typically cooled.

To this end, cooling channels are provided in the rotor at different locations, which extend in the axial direction, i.e., parallel to the axis of rotation (also the rotor axis) of the electric motor, and transport coolants. For this purpose, a corresponding volume flow of the coolant must be provided, which requires an oil pump, which however has an additional power consumption.

In order to reduce this, the documents DE 10 2014 009 926 A1, EP 4 142 121 A1 and EP 2 110 926 A1 known from the prior art disclose cooling channels introduced in the rotor in the axial direction, which have a slope in the radial direction, i.e., perpendicular to the rotor axis, whereby the coolant flows through the coolant channel due to the centrifugal force present during rotation of the rotor.

Patent document U.S. Pat. No. 2,018,375 395 A1 discloses a rotor with a meandering coolant channel, wherein a coolant flows radially into the coolant channel provided on a rotor base body starting from an inflow channel extending through a rotor shaft and flows out of the coolant channel via the two end sides of the rotor base body. The inlet of the coolant channel is radially spaced apart from the outlet of the coolant channel.

Document EP 2 490 322 A1 describes a rotor with a cooling channel extending between the two end faces, wherein the cross-section of the cooling channel increases from the inlet to the outlet.

A rotor with a rotor base body is known from document DE 10 2019 216 982 A1, wherein the rotor base body comprises a plurality of coolant channels. Each coolant channel has two coolant sections radially offset from each other.

SUMMARY

In an embodiment, the present disclosure provides a rotor of an externally excited synchronous machine, comprising a rotor core having rotor teeth arranged star-shaped about a rotor axis on the rotor core, at least one winding per rotor tooth, which is wound around a corresponding rotor tooth, and at least one displacement body, which is arranged in a groove between the windings of adjacent rotor teeth and extends in an axial direction of the rotor. The rotor further comprises at least one cooling channel, which is arranged in the at least one displacement body and through which coolant flows, comprising a coolant inlet on an axial end face of the displacement body, configured to introduce coolant into the cooling channel, and a coolant outlet on an opposite axial front axis of the displacement body, configured to discharge coolant from the cooling channel. A slope is provided between the coolant inlet and the coolant outlet in a radial direction of the rotor and a distance in the radial direction from the coolant inlet to the rotor axis is less than a distance in the radial direction from the coolant outlet to the rotor axis, so that an offset is formed in the radial direction between the coolant inlet and the coolant outlet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
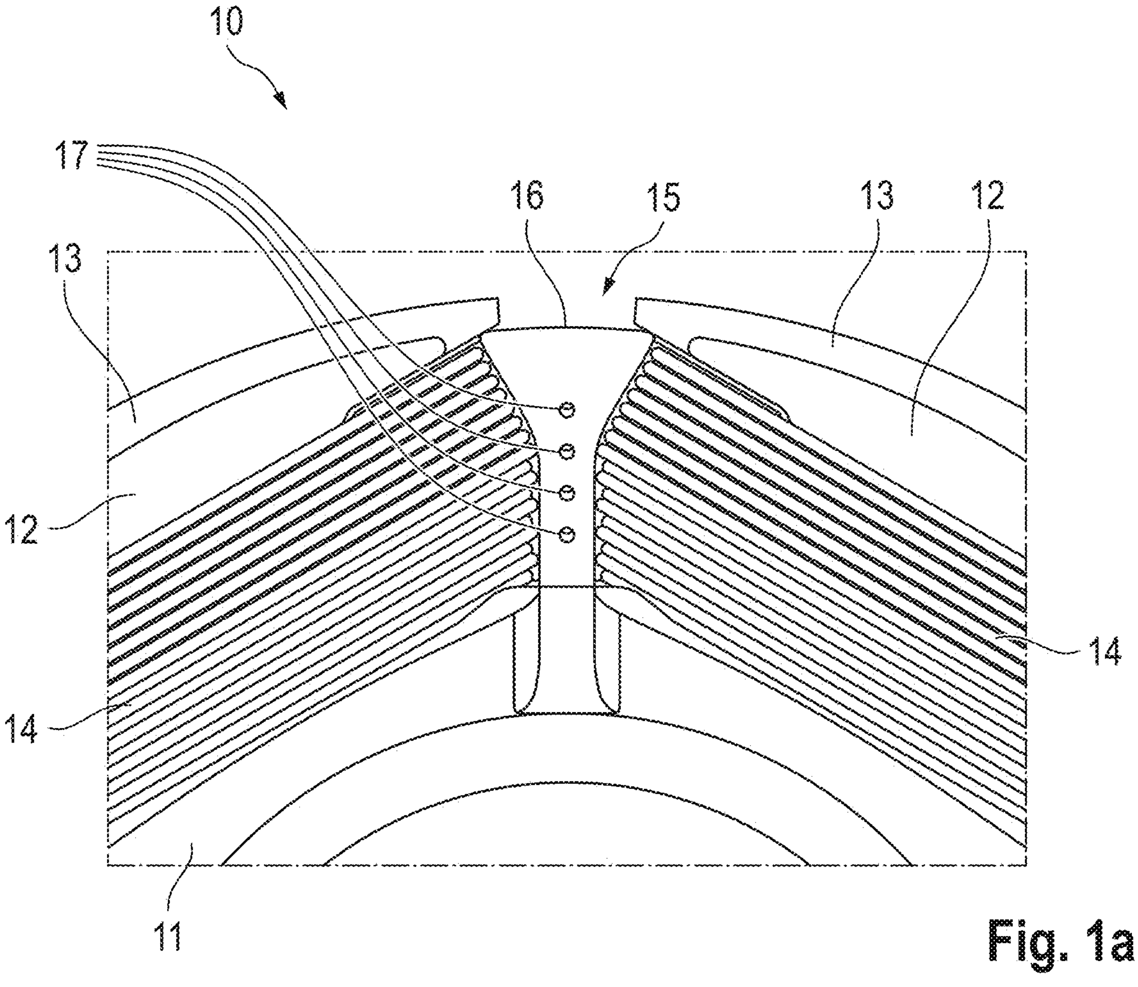
FIG. 1*a* shows a section of a top plan view parallel to the rotor axis of a rotor according to a first embodiment of the invention.

In light of the background of the aforementioned prior art, in an embodiment, the present invention further reduces the power consumption of the oil pump and thus improves the overall efficiency of the electric motor. In an embodiment, the present invention also provides an externally excited synchronous machine with a rotor and a corresponding motor vehicle with an externally excited synchronous machine.

The rotor of an externally excited synchronous machine according to an embodiment of the invention comprises a rotor core with rotor teeth arranged star-shaped about a rotor axis on the rotor core, wherein at least one winding is provided per rotor tooth, which is wound around the corresponding rotor tooth. Rotor core and rotor teeth are preferably formed from a sheet packet with laminations arranged perpendicular to the rotor axis. Furthermore, at least one displacement body is arranged in a groove formed between the windings of adjacent rotor teeth, which extends in the axial direction of the rotor, i.e., parallel to the rotational axis. Furthermore, at least one cooling channel is provided which is arranged in the at least one displacement body and through which coolant flows and which has a coolant inlet on an axial end face of the positive displacement body, configured to introduce coolant into the cooling channel, and a coolant outlet on the opposite axial front axis of the positive displacement body, configured to discharge coolant from the cooling channel. According to an embodiment of the invention, a slope is provided between the coolant inlet and the coolant outlet in the radial direction of the rotor, i.e., perpendicular to the rotor axis, wherein the distance in the radial direction from the coolant inlet to the rotor axis is less than the distance in the radial direction from the coolant outlet to the rotor axis, so that an offset is formed in the radial direction between the coolant inlet and the coolant outlet.

Due to the offset in the radial direction between the coolant input and the coolant output and the resulting slope formed in the radial direction, the coolant in the displacement body is pressed against the outer wall of the cooling channel by the centrifugal force when the rotor rotates and is thus automatically accelerated in the axial direction of the rotor towards the coolant outlet. Thus, this acceleration in the axial direction no longer needs to be provided by the pump to maintain the volume flow of the coolant, so that the pumping power can be reduced and the overall efficiency of the electric motor can be increased.

In an advantageous embodiment of the invention, the cooling channel is formed by a bore oriented substantially in the axial direction. This means that the bore is only configured in the axial direction up to the offset in the radial direction. Such an embodiment allows a particularly simple geometry of the cooling channel to be achieved, which has many advantages, in particular with regard to manufacturing costs. In addition, the cooling channels can be selectively introduced to the required locations depending on the temperature distribution in the displacement body.

In an embodiment of the invention, the at least one cooling channel is formed by a slot extending in the radial direction. The slot is preferably configured to extend continuously from radially inwards to radially outwards and does not form any points that are at a smaller distance from the axis of rotation than a previous point, and thus the distance to the axis of rotation increases continuously. In other words, when conceptually tracing the contour of the slot from radially inwards to radially outwards, there is no turning point, which results in the radial distance between the contour of the slot and the rotor axis decreasing. In a preferred embodiment, the slot is formed undulating in the radial direction. The undulating contour of the slot allows the coolant to be evenly distributed in the displacement body and the cooling capacity to be increased.

Preferably the displacement body is configured to substantially completely fill the groove between two rotor teeth. The formulation “substantially complete” means that the displacement body is in contact with the adjacent windings and completely fills the groove up to the cavities caused by the curves of the windings of the wire of the windings. Such displacement bodies can further increase efficiency, as the displacement body is particularly well cooled by the cooling channels and thus the volume in the rotor cooled by the cooling channels can be maximized, in particular because there is direct contact with the windings.

Furthermore, an advantageous embodiment of the invention is one in which at least one cooling channel additionally comprises a slope in the radial tangential direction of the rotor for the slope in the radial direction between the coolant inlet and the coolant outlet, such that a second offset in the tangential direction is formed between the coolant inlet and the coolant outlet, and the coolant outlet is arranged in the rotational direction of the rotor behind the coolant inlet. Such an embodiment allows the coolant to be further accelerated when the rotor rotates, which further reduces the pumping efficiency and increases efficiency.

In a rotor according to an embodiment of the invention, the slope between the coolant inlet and the coolant outlet in the radial direction or tangential direction of the rotor is not linear, but in particular square. A suction effect can be produced in the cooling channel by means of specifically shaped cooling channels with, for example, an increasing square slope, which increases the axial acceleration of the coolant. It is also contemplated that the cooling channel is configured in sections, with different sections having different slopes. As a result, the acceleration of the coolant within the cooling channel can be controlled and thus the advantageous effect of embodiments of the invention can be further enhanced.

The externally excited synchronous machine according to an embodiment of the invention comprises a rotor according to the present disclosure, while a motor vehicle according to an embodiment of the invention comprises an externally excited synchronous machine according to the present disclosure.

Advantageous aspects and embodiments of the invention are explained in more detail below with reference to the accompanying figures.

FIG. 1*a* shows a section of a top plan view parallel to a rotor axis R (rotational axis) of a rotor 10 according to a first embodiment of the invention. The rotor 10 comprises a rotor core 11, on which rotor teeth 12 are arranged in a star-shaped manner about the rotational axis R and which face radially outwards. The rotor core 11 as well as the rotor teeth 12 are formed from a sheet packet of individual laminations, which are arranged perpendicular to the rotor axis R. A rotor drum 13 is arranged around the circumference of the rotor 10. Windings 14 are arranged around the rotor teeth 12 to generate the magnetic field of the rotor 10. A groove 15 is arranged between adjacent rotor teeth 12, which is filled by a displacement body 16 extending in the axial direction. The displacement body 16 is clamped by the windings 14 around the rotor teeth 12 and the drum 13 and is thus fixed in position. The displacement body 16 comprises cooling channels 17 that extend in the axial direction through the displacement body 16.

Figure 1B:
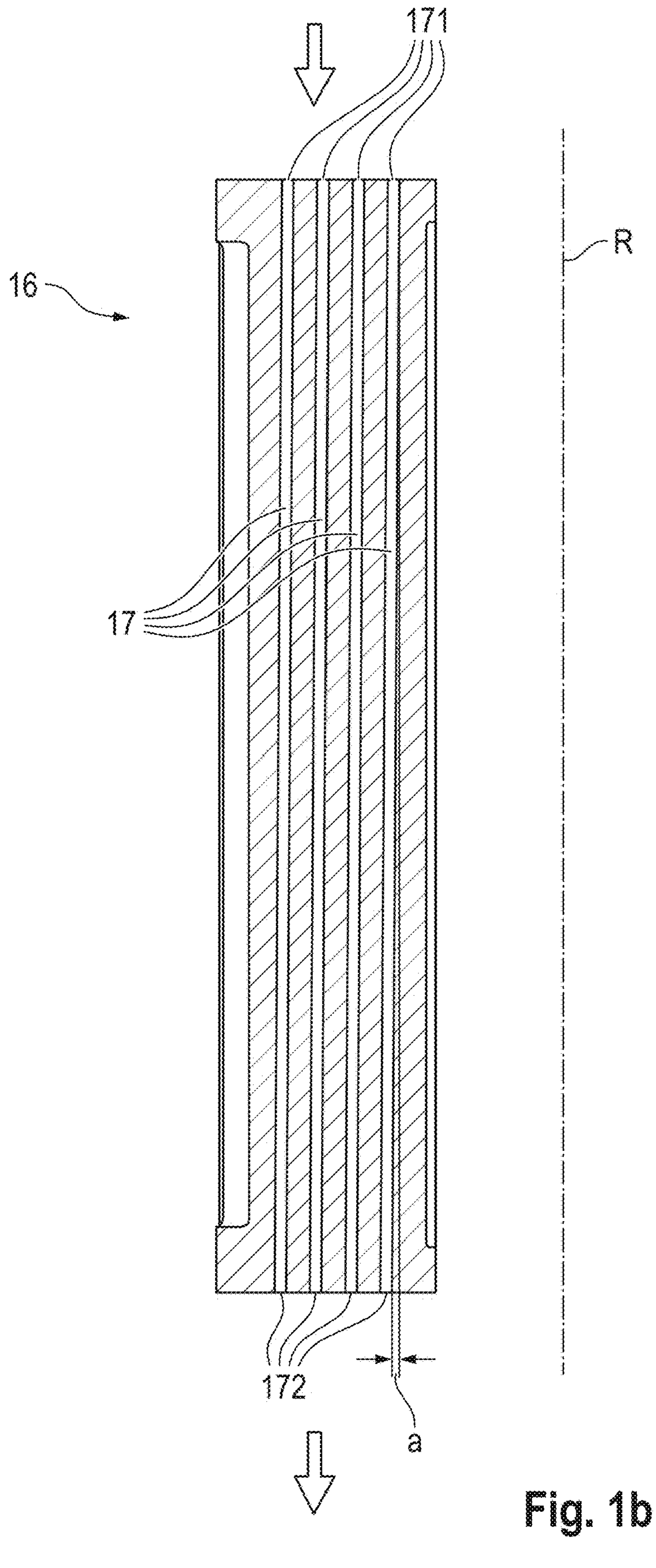
FIG. 1*b* shows a detail view of a displacement body according to the embodiment of FIG. 1*a;*

FIG. 1*b* shows the displacement body 16 shown in FIG. 1*a* in a detailed view from the side without the windings 14, the rotor core 12 and the rotor teeth 13 delimiting it. The rotor axis R, which acts as the rotational axis for the rotor 10, is shown as a dashed line. The four cooling channels 17 shown extend in the axial direction along the displacement body 16 and each have a coolant inlet 171 and a coolant outlet 172, wherein these are each arranged on the axially opposite end faces of the displacement body 16. A coolant outlet 172 is always further from the rotor axis R by an offset a in the radial direction than the associated coolant inlet 171. As a result, a slope is generated in the radial direction between the coolant inlet 171 and the corresponding coolant outlet 172.

The arrows shown at the coolant inlets 171 and coolant outlets 172 indicate the direction of entry of a coolant, and thus the coolant flow, wherein the coolant is pumped through the displacement body 16 by a pump. Due to the rotation during operation of the rotor 10, the coolant in the cooling channels 17 is pressed radially outwards by the centrifugal force. Due to the offset a, the coolant also experiences a downward force in the drawing plane of FIG. 1*b*, i.e., in the axial direction of the rotor 10, due to the slope in the cooling channels 17 in addition to the purely radial force component of the centrifugal force. Thus, the coolant is accelerated in the axial direction, which is why the pump does not have to apply this axial acceleration component to provide the volume flow of the coolant. Consequently, the pumping power and thus the power consumption can be reduced and the overall efficiency of the externally excited synchronous machine can be improved.

In the embodiment shown, the radial slope between the coolant inlet 171 and the coolant outlet 172 is shown linearly, wherein embodiments of the invention are can also be provided in which the slope of the cooling channel 17 is not linear but in particular square. In particular, an axially extending cooling channel 17 can also be provided first, which only later has a slope. Thus, cooling channels 17 with different designs in sections are also provided in order to influence the axial acceleration to the coolant within the cooling channel 17.

Furthermore, embodiments are also provided in which, in addition to the radial slope between the coolant inlet 171 and the coolant outlet 172, a slope is provided in the tangential direction, i.e., in the circumferential direction of the rotor 10, whereby the advantageous effect achieved by embodiments of the invention can be further enhanced.

Figure 2A:
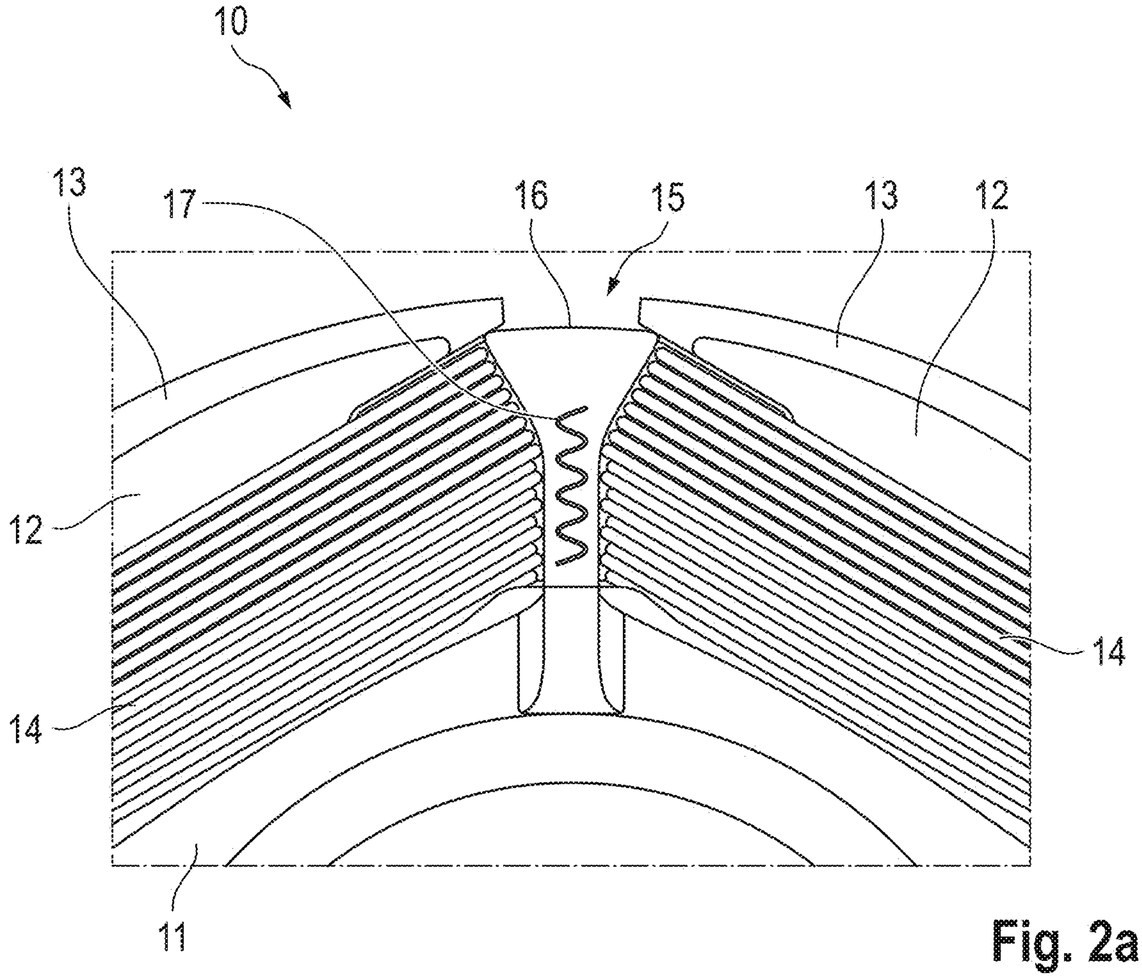
FIG. 2*a* shows a section of a top plan view parallel to the rotor axis of a rotor according to a second embodiment of the invention.
Figure 2B:
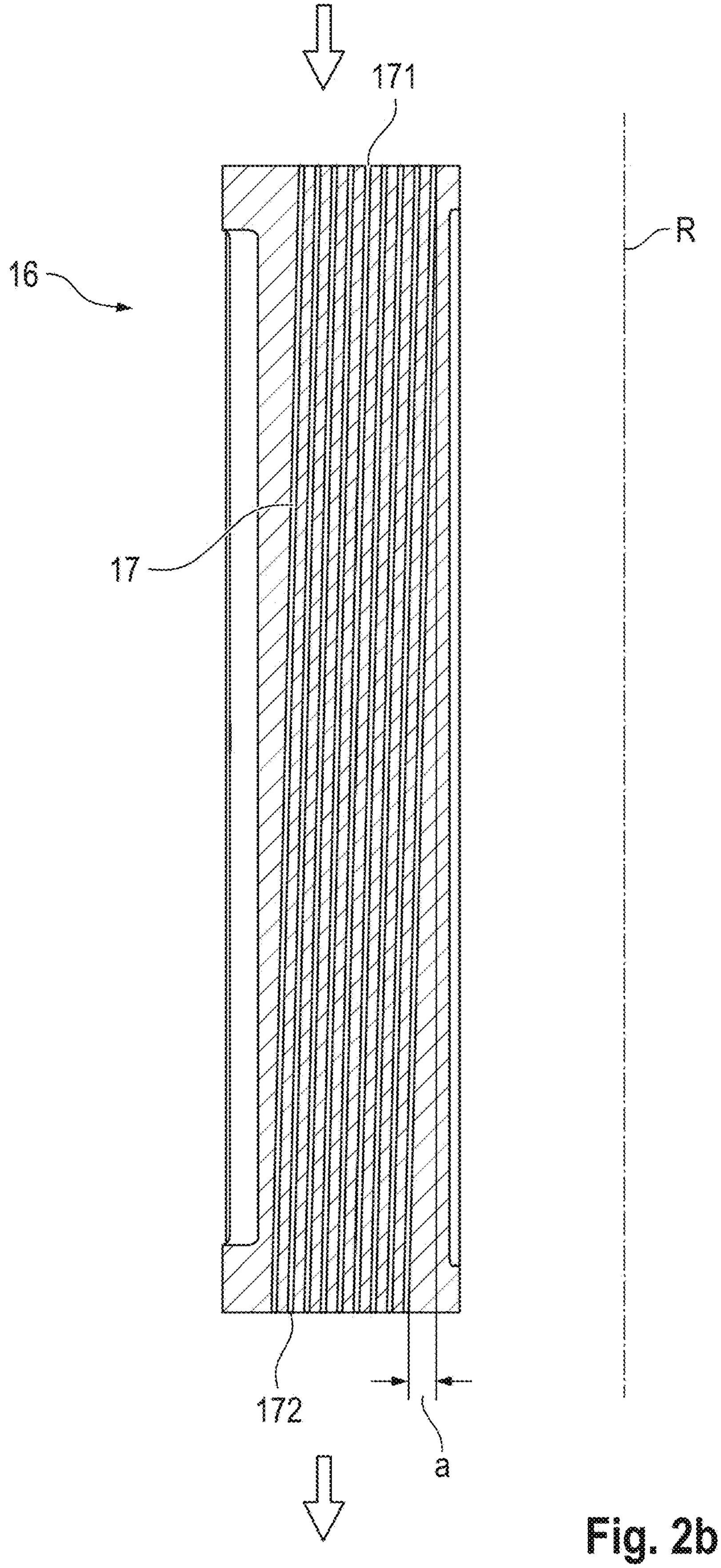
FIG. 2*b* shows a detail view of a displacement body according to the embodiment of FIG. 2*a.*

FIGS. 2*a* and 2*b* show a second embodiment according to the invention, which corresponds in largely to the first embodiment of the invention shown in FIGS. 1*a* and 1*b*, which is why the differences between the embodiments will be discussed here. In contrast to the embodiments in FIGS. 1*a* and 1*b*, only a slot-shaped cooling channel 17 is provided here instead of the individual cooling channels 17 designed as a bore. This has an undulating design in the radial direction or has a short radial undulation. Combinations of differently designed cooling channels 17 in a rotor 10 or in a displacement body 16 are also provided. The undulating cross-sectional shape allows a large area of the displacement body 16 to be cooled. Other shapes of a slot extending radially outwards as a cooling channel 17 and other cross-sectional geometries of a cooling channel 17 are also provided.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rotor of an externally excited synchronous machine, comprising:

a rotor core having rotor teeth arranged star-shaped about a rotor axis on the rotor core;

at least one winding per rotor tooth, which is wound around a corresponding rotor tooth;

at least one displacement body, which is arranged in a groove between the windings of adjacent rotor teeth and extends in an axial direction of the rotor; and at least one cooling channel, which is arranged in the at least one displacement body and through which coolant flows, comprising a coolant inlet on an axial end face of the displacement body, configured to introduce coolant into the cooling channel, and a coolant outlet on an opposite axial front axis of the displacement body, configured to discharge coolant from the cooling channel, wherein a slope is provided between the coolant inlet and the coolant outlet in a radial direction of the rotor and a distance in the radial direction from the coolant inlet to the rotor axis is less than a distance in the radial direction from the coolant outlet to the rotor axis, so that an offset is formed in the radial direction between the coolant inlet and the coolant outlet, wherein the at least one cooling channel is formed by a slot extending in the radial direction, and wherein the slot is formed undulating in the radial direction.

2. The rotor according to claim 1, wherein at least one second cooling channel is formed by a bore oriented substantially in the axial direction.

3. The rotor according to claim 1, wherein the displacement body is configured to substantially completely fill the groove between two rotor teeth.

4. The rotor according to claim 1, wherein the at least one cooling channel additionally comprises a slope in a radial tangential direction of the rotor for the slope in the radial direction between the coolant inlet and the coolant outlet, such that a second offset in the tangential direction is formed between the coolant inlet and the coolant outlet, and the coolant outlet is arranged in a rotational direction of the rotor behind the coolant inlet.

5. The rotor according to claim 4, wherein the slope between the coolant inlet and the coolant outlet is in the radial direction, and the tangential direction of the rotor is non-linear.

6. The externally excited synchronous machine comprising the rotor according to claim 1.

7. A motor vehicle comprising the externally excited synchronous machine according to claim 6.

8. A rotor of an externally excited synchronous machine, comprising:

a rotor core having rotor teeth arranged star-shaped about a rotor axis on the rotor core;

at least one winding per rotor tooth, which is wound around a corresponding rotor tooth;

at least one displacement body, which is arranged in a groove between the windings of adjacent rotor teeth and extends in an axial direction of the rotor; and at least one cooling channel, which is arranged in the at least one displacement body and through which coolant flows, comprising a coolant inlet on an axial end face of the displacement body, configured to introduce coolant into the cooling channel, and a coolant outlet on an opposite axial front axis of the displacement body, configured to discharge coolant from the cooling channel, wherein a slope is provided between the coolant inlet and the coolant outlet in a radial direction of the rotor and a distance in the radial direction from the coolant inlet to the rotor axis is less than a distance in the radial direction from the coolant outlet to the rotor axis, so that an offset is formed in the radial direction between the coolant inlet and the coolant outlet, and wherein the at least one cooling channel additionally comprises a slope in a radial tangential direction of the rotor for the slope in the radial direction between the coolant inlet and the coolant outlet, such that a second offset in the tangential direction is formed between the coolant inlet and the coolant outlet, and the coolant outlet is arranged in a rotational direction of the rotor behind the coolant inlet.

9. The rotor according to claim 8, wherein the slope between the coolant inlet and the coolant outlet is in the radial direction, and the tangential direction of the rotor is non-linear.

10. The rotor according to claim 8, wherein the at least one cooling channel is formed by a bore oriented substantially in the axial direction.

11. The rotor according to claim 8, wherein the displacement body is configured to substantially completely fill the groove between two rotor teeth.

12. The externally excited synchronous machine comprising the rotor according to claim 8.

13. A motor vehicle comprising the externally excited synchronous machine according to claim 12.

* * * * *